Oct. 19, 1954  H. W. BOESSENKOOL ET AL  2,691,815
SOLID PHASE BONDING OF METALS
Filed Jan. 4, 1951

BEFORE SINTERING

AFTER SINTERING

Helmich W. Boessenkool,
George Durst,
Inventors.
Koenig and Pope,
Attorneys.

Patented Oct. 19, 1954

2,691,815

UNITED STATES PATENT OFFICE 2,691,815

SOLID PHASE BONDING OF METALS

Helmich W. Boessenkool, South Easton, and George Durst, Attleboro, Mass., assignors to Metals and Controls Corporation, Attleboro, Mass., a corporation of Massachusetts Application January 4, 1951, Serial No. 204,346

9 Claims. (Cl. 29—189)

This invention relates to the solid phase bonding of metals, i. e., the joining of solid metals without adding or otherwise producing a liquid phase between the metals.

This invention is an enlargement upon the mode of solid phase bonding disclosed in our earlier copending application entitled "Bonded Metals and Their Manufacture," Serial No. 86,857, filed April 11, 1949, and this application is a continuation-in-part of said earlier application which has since been abandoned.

The invention pertains to the solid phase bonding of such pairs of dissimilar metals, as, for example, tantalum and brass, pure iron and titanium, copper and stainless steel, nickel and molybdenum, gold and tin bronzes, silver and brass and, in general, the solid phase bonding of any metals, identical or dissimilar, provided the metals are of such physical characteristics, including malleability, as to permit their being deformed as required by the process of this invention. The term "metal" is used in its broad sense, meaning either an elementary metal or an alloy.

Among the several objects of the invention may be noted the provision of methods for bonding malleable metals which result in a marked decrease of the amount of scrap of composite metal; the provision of methods of the class described which are economical and require no elaborate apparatus; the provision of methods for bonding metals which are readily adaptable to the continuous bonding of long strips of metal; the provision of methods of bonding metals which combine in a single operation the steps of bonding and deforming the metal to the final required thickness without further deforming operations; the provision of methods of making composite bonded metal stock that is inexpensive and possesses highly desirable characteristics; and the provision of methods of bonding metals of widely differing yield points wherein the ratio of thickness of the metals remains substantially the same throughout the process. Other objects will be in part apparent and in part pointed out hereinafter.

The invention accordingly comprises the steps and sequence of steps, and features of manipulation, which will be exemplified in the methods hereinafter described, and the scope of the application of which will be indicated in the following claims.

In the accompanying drawings, in which certain features of one of various embodiments of the invention are shown:

Figure 1:
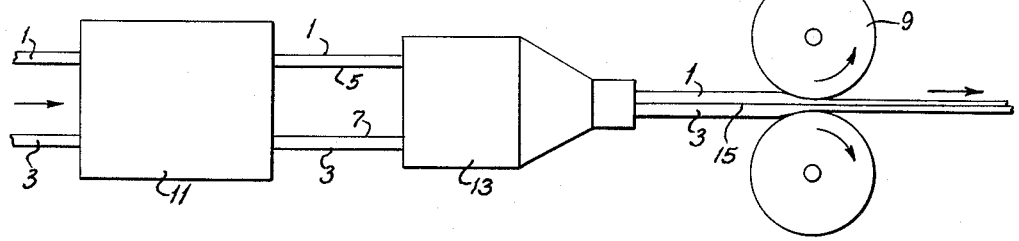
Figure 1 is a diagrammatic elevation of apparatus with which the invention may be carried out.

There are several methods now in use for bonding metals. In order to understand more clearly the importance of each step in the process of our invention, and why it produces results which have been looked for in the industry but never realized to any practical extent, a brief discussion of the prior art will now be given.

The art of manufacturing clad or composite metals by a process in which no liquid phase is present at the bond line is old. In general, however, one can group all methods previously used into two broad classifications involving: (1) Single step processes in which metals are simultaneously heated to a very high temperature approaching the melting point of one of the metals and at the same time deformed either by pressing or repetitive rolling, the metals being crushed against one another at elevated temperature and simultaneously held in contact for an appreciable length of time; or (2) multistep processes in which some of the above steps are done at separate times.

Typical of the single-step high temperature bonding processes mentioned above is the solid phase welding described by A. B. Kinzel in the Adams lecture presented before the American Welding Society in Cleveland, Ohio, on October 16, 1944. In this paper Kinzel describes a process, well known in the art, in which two reasonably clean metals are pressed together and heated for an appreciable length of time while under pressure in order to develop a bond between them.

There are two-stage processes for producing thin layers of aluminum on steel or other base metal by (1) cleaning the aluminum by wire brushing and the other metal indifferently or not at all; and (2) rolling the two metals together under heavy reductions at room temperature or slightly above. These methods have been used to produce aluminum clad steel where the aluminum layer was so thin that no real measure of the bond strength could be obtained. This difficulty of measurement stems from the fact that extremely thin layers of soft metals, though weakly bonded, cannot be peeled from the metal to which they are affixed, without themselves pulling apart. The situation is analogous to moist tissue paper pasted to a hard surface; not a good bond certainly, but, nevertheless, the frail paper is very difficult to remove without tearing. In order to make these aluminum-clad metals malleable enough for forming operations, they were annealed, in which process great precautions had to be taken not to spoil the bond.

Another method sometimes used for making iron strip coated with copper, nickel, or their alloys, which is similar to the aluminum-cladding technique described above, involves heating the iron strip to temperatures between 300 and 500° C. (572° F. and 932° F.) and passing the hot iron strip, together with the cold copper, nickel, or copper-nickel alloy, through a single heavy rolling pass at reductions of about 60%. No particular care is taken in any cleaning process to prepare the surfaces for bonding, nor is a subsequent heat treatment used in this process. Again the cladding layers are quite thin and the bond strength indeterminate.

A further method of hot bonding stainless steel to aluminum as one step in a process for making cooking pots consists of degreasing and chemically etching the stainless steel so as to form a roughened surface, developing a roughened surface on the aluminum, and thereafter placing the metals in contact, heating them to 600–900° F., and hot rolling them in a single pass which reduces the overall thickness a minimum of 5%. In the process, the pressure is sufficient to cause the softer aluminum to flow into the crevices of the surface of the harder stainless steel, which forms a temporary bond of considerable strength. After the composite metal is thus preliminarily bonded and, if desired, subjected to a drawing step, it is heated up to or about the temperature of recrystallization of the aluminum to improve the bond. It is impractical by this technique to bond the two metals at temperatures lower than 600° F.

As to cold welding, there is a method which consists essentially of pressing localized areas under extremely heavy pressure at room temperature, so as to cause great local deformation and welded spots. There is no attempt to improve the weld strength of these localized spots by a subsequent treatment in the process.

In contrast to the above, we have developed a multi-stage bonding process which has universal application to the bonding of all malleable metals and which permits the bonding to be accomplished at "cold working temperatures." By "cold working temperatures" we mean all temperatures from room temperature up to the minimum recrystallization temperature of the metal having the lowest recrystallization temperature of the several materials being bonded.

Considering our invention in its broadest concept, it consists basically of three steps to be used in the bonding of layers of any malleable metals, these steps being: (1) A meticulous preparation of the surfaces so as to adapt them to bonding; (2) a deformation of the layers of metal such that the contiguous mating surfaces (still maintained in the meticulous condition of step 1) undergo an enlargement in area while at the same time being strongly forced together, so that they form true discrete metallic bonds at many isolated points; and (3) a heating or sintering operation whereby the bonds at the isolated spots are caused to grow laterally so as to produce a metallic bond extending substantially completely across the entire area of the contiguous surfaces.

Discussing now in detail the above steps of our invention, surface preparation as used in our invention is not to be confused with prior cleaning processes. The fundamental necessity of the proper kind of surface preparation has never before been understood. Scratch brushing or other heretofore proposed methods of cleaning, as previously used, leave or permit the reappearance of a more or less continuous film of molecular dimensions, effective in preventing the atoms of one of the metals from coming within the field of attraction of the atoms of the other metal, a condition necessary for bonding. For example, pure alcohol is commonly thought of as a cleaning agent. If two surfaces are put in an absolutely clean state and then one is wiped with alcohol, they will not thereafter bond by our process, unless prepared anew according to the present invention or unless the metals are heated sufficiently to eliminate the residual films resulting from the alcohol. Yet the surface so wiped by alcohol is a surface well within the purview of the cleanliness taught by the prior art.

As a further example of the formation of such films, the following experiment is cited: Two pieces each of fine silver and silver solder, the latter having the composition of 50% silver, 15.5% copper, 16.5% zinc and 18% cadmium, were meticulously freed from molecular film as hereinafter described. A piece of the silver was combined with a piece of silver solder and this combination was deformed by a single pass through a rolling mill, within one minute after the above cleaning. The resulting bond after heat treating was very good. The other piece of cleaned silver and cleaned silver solder were kept at room temperature in air for approximately one hour. The relative humidity of the air was high. Then these pieces were similarly deformed by a single pass through the above rolling mill exactly as the first two pieces. However, these two pieces did not bond (because of the molecular film that formed during the one hour delay), and as the pieces emerged from the rolling mill the layers opened up.

We find it indispensable (as contrasted to prior art teaching) to create a condition which we will term, for lack of precedent, "freedom from barrier films." The lack of precedent arises, we believe, from the failure of earlier investigators to realize the existence and importance of these "barrier films." By the term "barrier films" we mean films, not necessarily continuous, which approach molecular dimensions in thickness and which either resist the cleaning methods taught by the prior art or reform after said cleaning.

Typical of these barrier films are long chain polar molecules; natural oxide and compound films both of which are, as a rule, hydrated; chemisorbed layers and adsorbed layers of liquids and gases.

We emphasize that natural oxide films (that is, oxides formed by simple exposure to air at room temperature), which are hydrated, i. e. contain water in various forms, such as hydrate, adsorbed layers, and possibly water bonded by other mechanisms, are very objectionable. However, very thin, barely visible, dehydrated oxide films, i. e., films created by heat as contrasted with natural oxide films, show inconsequential barrier action. When these dehydrated films are thicker, they may mechanically interfere with bonding and behave like gross contaminants. In moist atmospheres or oil laden air, particularly at low temperatures, dehydrated oxide films may become potent barriers within minutes, if not seconds.

We first remove gross contaminants by any of the means taught by the prior art, and then proceed to remove the barrier film. There are several methods for removing the barrier film, among which may be mentioned bright annealing after conventional cleaning, or pickling follower by a heating step to remove the film caused by such immersion. This heating must reach a temperature high enough either to decompose the barrier film formed by this immersion or to transform it into an innocuous film and must at the same time be low enough to prevent oxidation (unless oxidation is prevented by other means). We can use a protective atmosphere furnace for such heating, but we can also use a blast of heated air or other gas, impinging flames, infra-red heat, or high frequency induction heating.

We prefer, however, to use abrasion methods. Of the several possibilities for abrading a metal surface, such as grit blasting, belt sanding, or wire brushing, we prefer wire brushing because it does not leave behind embedded particles. In addition to the cutting action of the wire brush, a very appreciable generation of surface heat is caused to take place and is used to dissociate and drive off such barrier films as were not mechanically abraded. The heat generation by powerful abrading means can be surprisingly intense, even to the exent of causing melting of the surface layers of high melting metals, if the abrading is prolonged. On the other hand, it is possible by adjusting the time during which the powerful abrasion is operative to generate the surface heating required to decomposing the barrier films not previously removed, without inviting the creation of a detrimental oxide film on the metal surface.

However, the heat caused by abrading must not raise the bulk temperature of the metal to the point that the metal can form objectionable oxide films in the time interval between the cleaning and the bonding step, in case the prepared surfaces are in contact with air. By using neutral or protective atmospheres the energy input by abrading can be raised without forming objectionable oxides. As mentioned previously, such heat-formed dehydrated oxide layers do not interfere appreciably with bonding if they are thin enough.

We may consider the dehydrated oxide layers brittle, so that they disintegrate when the metals are deformed, thus exposing entirely uncontaminated metal surfaces. We assume that the natural oxide or non-fresh dehydrated oxide on the other hand is either tenacious enough to stretch with the expanding surface or it repairs instantaneously any gaps caused by the increase in area.

As example of rendering the hydrated oxide film innocuous is the case of the natural oxide which forms on aluminum in normal air and which is a barrier to bonding by our process; but which may be converted into dry, harmless film by heating, if thin enough.

Therefore, we include in our meaning of surface preparation a production of a new surface on the metal; and thus surface preparation for the purposes of this invention means providing a new surface for the metals to be bonded, irrespective of whether the newness results from the removal of an existing barrier film or the change of existing film into one which will not have a barrier effect.

In applying our surface preparation to strip or sheet, we have found it practical to use rotating steel wire brushes of from 12 inches to 8 inches in diameter at speeds of 2000 to 4000 R. P. M., and we adjust them in such a way that we dissipate approximately 175 to 1100 watts per inch of strip width, depending on the translation speed of the strip, its thickness, and its nature. Hard metals require more power than soft metals.

We wish to stress the importance of the residual heat of the strips while they travel from the brush to the bonding means. It is well known that adsorption layers can be destroyed by heat and that relatively low degrees of elevated temperature can retard the formation of adsorption layers on surfaces which were freed from such films. Thus, besides the brevity of the interval between brushing and deformation we can utilize the adsorption-retarding effect of temperatures above room temperature and preferably above the boiling point of water. If the temperature rise is such as to encourage the formation of deleterious oxide films, then recourse may be had to the use of a protective atmosphere up to the time of mating and deformation. If this atmosphere is used and is maintained until that time, the low viscosity and high diffusion rate of some reducing atmospheres, particularly hydrogen, may be a contributing factor to the prevention of minute blisters or discontinuities at the interface.

Among the necessary measures to insure the best surface preparation by wire brushing must be mentioned the cleanliness of the brushes and of the guiding means that contact the strip surfaces. These parts must be clean in the sense that they are free from any trace of lubricants, oils, greases, etc. We have found that degreasing of brushes by solvents in vapor or liquid form is insufficient. The best results are obtained by first degreasing and then heating the brushes in air to destroy residual contaminants. The contacting parts, guides, etc., can, in general, be sufficiently well cleaned by sanding.

Reference is made to the copending application of George Durst for Cleaning Metal Strip, Serial No. 180,829, filed August 22, 1949, for a specific disclosure of a suitable scratch-brushing apparatus and method for preparing the surface of metals.

After the surface preparation, loose dust, if any, on the surface of the metals is removed in a sweep chamber, and redeposition of dust on the mating surfaces is prevented up to the time of bonding.

Reference is made to the copending application of George Durst, one of the inventors herein, entitled "Apparatus for Cleaning Metal Strips," Serial No. 166,631, filed June 7, 1950, now abandoned, for a specific disclosure of a suitable type of sweep chamber. It will be understood that a sweep chamber is especially preferred when surface preparation is effected by an abrasion method.

Coming now to the deformation step, this must, as indicated above, be such a deformation of the metals as will cause the mating surfaces to increase considerably in area.

There are several means for accomplishing this deformation, among which may be mentioned rolling mills where strips or sheets of metals are bonded by our process; wire or tube drawing dies where a tube is to be bonded around a rod or another tube; strand extrusion presses, where two metals are jointly squeezed through an orifice; impact extrusion presses to form at one impact a multilayered cup or tube; and upsetting where two rods of metal are forced together endwise to form an area larger than the cross section area of the rods. The fundamental principles underlying our invention, and the basic steps involved, are the same for all these means.

Figure 2:
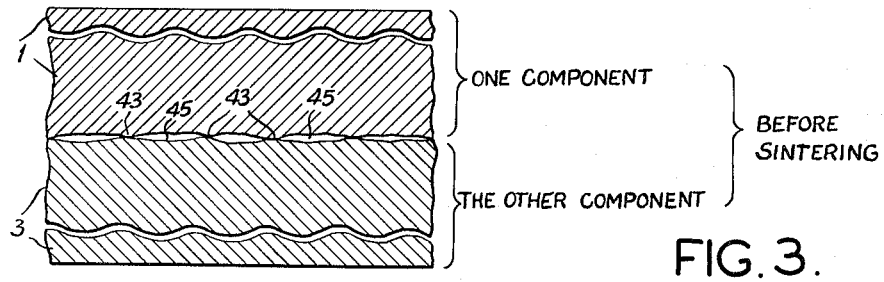
Figure 2 is a greatly enlarged fragmentary cross section of composite stock at an intermediate stage, thicknesses being greatly exaggerated.
Figure 3:
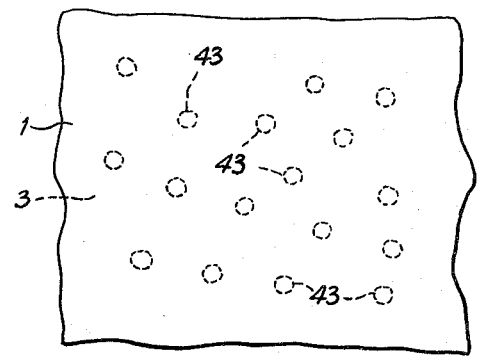
Figure 3 is a greatly enlarged plan view of the composite stock of Figure 2.

In all these means for deformation under pressure, the extension of the surfaces previously freed from barrier films helps the atoms of the one metal to come within the field of atomic attraction of the other metal in numerous isolated or discrete spots, and thus results in adherence which may be relatively weak but is sufficiently strong to hold the surfaces in contact and predisposed to be transformed into a substantially complete bond. We call these isolated or discrete bond spots "nucleal bonds" because these spots form nuclei for subsequent growth into a substantially continuous bond. This is illustrated in Figures 2 and 3, wherein layers 1 and 3 are shown as joined by nucleal bonds 43. It should be emphasized that these nucleal bonds are in no way different in character from the final bond, but they extend only over a multitude of exceedingly small areas, whereas the final bond extends substantially over the total interfacial area.

One embodiment of our invention proposes its use for the production of composite sheet and strip. In this case we use a rolling mill to accomplish the necessary deformation, whereby the rolls of the mill exert the forces required to press the metals together while simultaneously extending the areas of the mating surfaces.

In the rolling operation, even of a single sheet of metal, the top portion of the metal being rolled has a tendency on the exit side to curl up, and similarly the lower portion of the rolled metal tends to curl down. This tendency is well known in the art and often designated as "alligatoring." The nucleal bond as formed by the deformation and pressure must be sufficiently strong to prevent its destruction by this alligatoring force. It must also be strong enough to permit handling of the strip.

Sufficient strength of the nucleal bond can be obtained by judiciously selecting (in accordance with the instructions set forth herein) the reduction in the thickness of the strip in relation to the diameter of the rolls, the thickness of the strip prior to rolling and the work-hardening characteristics of the metals involved. Other factors are the presence of front and rear strip tension and the degree of lubrication between the roll and strip surface.

In general, the greater the thickness of the component metals and the greater their work-hardening tendency, the greater is the amount of reduction required to form a sufficiently strong nucleal bond to overcome the alligatoring tendency. On the other hand, the better the lubrication and the greater the tension on the strip the smaller the reduction required to counteract this tendency. In other methods of obtaining the deformation, the separating forces may be greater or smaller, depending on the particular means used and the products desired. In such cases analogous considerations govern.

In a rolling mill, the strips are squeezed together by the rolls with a relatively large area increase and the nucleal bonds are formed without the occurrence of any liquid phase at the interface. In general, in this cold-rolling operation the increase in mating area, as is known, can be readily calculated from the decrease in thickness of the composite strip caused by the rolling. For convenience we will, therefore, in the case of bonding by rolling, express the area increase in terms of a reduction in thickness. The preferred reduction for a large number of metals may be ascertained from the following table of specific examples. This table also gives preferred time and temperature for the heating operation (sintering) to effect growth of bond.

| No. | Type of metals and gauge (inches) A | Type of metals and gauge (inches) B | Type of metals and gauge (inches) C | Reduction, percent | Mill Roll diameter (inches) | Mill Exit speed (feet) per minute | Sintering Temp., °F. | Sintering Time (minutes) | Sintering atmosphere | Surface preparation |
|---|---|---|---|---|---|---|---|---|---|---|
| 1 | Ta .050 | Brass (90/10) .125 | | 74 | 2⅞ | About 15 | 1,400–1,500 | 10 sec.[1] | Air | Sanding. |
| 2 | Fe .125 | Ti .050 | | 82 | 2⅞ | do | 1,400–1,500 | 2 | Protective | Do. |
| 3 | Stainless steel (18/8) .012 | Cu .125 | Stainless steel (18/8) .012 | 77 | 5¼ | 30 | 1,300–1,500 | 2 | do | Do. |
| 4 | Ni .062 | Mo .007 | | 80 | 2⅞ | Ca. 15 | 1,400–1,500 | 15 | do | Do. |
| 5 | Invar (36 Ni, bal. Fe) .032 | Alloy (72 Mn, 18 Cu, 10 Ni) .037 | | 70 | 2⅞ | Ca. 15 | 1,100–1,200 | 2 | do | Do. |
| 6 | Invar .029 | Everdur (98.5 Cu, 1.5 Si) .039 | | 68 | 2⅞ | Ca. 15 | 1,100–1,200 | 2 | do | Do. |
| 7 | Fe .125 | Stainless steel (18/8) .008 | | 75 | 7 | 27.5 | 1,300–1,400 | 2 | do | Do. |
| 8 | Monel .010 | Bronze (92 Cu, 7 Zn, 1 Sn) .009 | | 63 | 2⅞ | 20 | 1,100–1,200 | 2 | do | Do. |
| 9 | Brass (70/30) .064 | 18% nickel-silver .024 | | 60 | 5¼ | 30 | 1,000 | 15 | do | Wire brush. |
| 10 | Pt .020 | SAE 1010 steel .056 | | 63 | 2⅞ | 30 | 1,400 | 5 | do | Sanding. |
| 11 | Fe .125 | Pd .008 | | 74 | 2⅞ | 30 | 1,200–1,400 | 2 | Nitrogen | Do. |
| 12 | 12 kt. yellow gold .025 | Ni .010 | | 66 | 2⅞ | 30 | 1,000–1,100 | 2 | Protective | Do. |
| 13 | Bronze (92 Cu, 7 Zn, 1 Sn) .125 | 10 kt. yellow gold .018 | | 79 | 7 | 27.5 | 1,000 | 2 | do | Do. |
| 14 | Bronze (92 Cu, 7 Zn, 1 Sn) .125 | 10 kt. yellow gold .006 | | 66 | 7 | 27.5 | 1,000 | 2 | do | Do. |
| 15 | Fe .125 | 10 kt. yellow gold .006 | | 69 | 7 | 27.5 | 1,100 | 2 | do | Do. |
| 16 | Fe .125 | Ag .010 | | 72 | 7 | 27.5 | 11–1,200 | 2 | do | Do. |
| 17 | Fe .125 | Ag .060 | | 82 | 7 | 27.5 | 11–1,200 | 2 | do | Do. |
| 18 | Fe .125 | Ni .010 | | 63 | 2⅞ | 25 | 13–1,400 | 2 | do | Do. |
| 19 | 12 Kt yellow gold .012 | 52S Al-alloy .062 | | 79 | 7 | 27.5 | 800 | 2 | Air | Do. |
| 20 | Sterling-silver .012 | 52S Al-alloy .123 | Ag .006 | 75 | 5¼ | 40 | 650 | 2 | do | Do. |
| 21 | 2 S Al .080 | Cu .010 | Ag .002 | 57 | 7 | 27.5 | 750 | 15 | do | Wire brush.[2] |
| 22 | 2 S Al .080 | Cu .010 | | 67 | 5¼ | 30 | 750 | 15 | do | Do.[3] |

See footnotes at end of table.

| No. | Type of metals and gauge (inches) | | | Reduction, percent | Mill | | Sintering | | Sintering atmosphere | Surface preparation |
|---|---|---|---|---|---|---|---|---|---|---|
| | A | B | C | | Roll diameter (inches) | Exit speed (feet) per minute | Temp., °F. | Time (minutes) | | |
| 23 | Coin silver .200 | Ag solder (50 Ag, 15.5 Cu, 16.5 Zn, 18 Cd) .006 | | 64 | 5¼ | 30 | 900 | 2 | Protective | Sanding. |
| 24 | Ag .085 | Ag solder (60 Ag, 20 Cu, 7 Zn, 10 Cd, 3 Sn) .003 | | 80 | 2⅞ | 15 | 1,000 | 2 | do | Do. |
| 25 | Cu .0926 | Ag-solder (55 Ag, 31.5 Cu, 11.7 Zn, 1.8 Ni) .0074 | | 63 | 5¼ | 30 | 900 | 2 | Air | Do. |
| 26 | Ag .018 | Bronze .082 | | 70 | 7 | 27.5 | 1,100 | 2 | Protective | Sanding and wire brush of Ag bronze only wire brush. |
| 27 | Cu .009 | 2 S Al .248 | | 82 | 5¼ | 30 | 800 | 2 | Air | Sanding. |
| 28 | 2 S Al .012 | Low Carbon steel .110 | 2 S Al .012 | 51 | 5¼ | 30 | 800 | 2 | do | Do. |
| 29 | Low carbon steel .125 | Ag .015 | | 68 | 5¼ | 30 | 1,000-1,100 | 2 | Protective | Do.[4] |
| 30 | Modified monel 45 Ni, 55 Cu .090 | Ag .0095 | | 55 | 5¼ | 40 | 1,200 | 50 | do | Wire brush.[5] |
| 31 | 12/20 gold plate having base of 92 Cu, 7 Zn, 1 Sn .080 | Silver solder (50 Ag, 15.5 Cu, 16.5 Zn, 18 Cd) .0104 | | 55.5 | 5¼ | 40 | 1,050 | 4 | do | Do.[6] |
| 32 | C Bronze (92 Cu, 8 Sn) .090 | Coin silver .0325 | | 55 | 5¼ | 40 | 1,050 | 50 | do | Do.[7] |
| 33 | Bronze (92 Cu, 7 Zn, 1 Sn) .125 | Sterling silver .0306 | | 58.5 | 5¼ | 35 | 1,050 | 50 | do | Do.[8] |
| 34 | Invar (36 Ni, bal. Fe) .040 | "F" metal (98 Cu, 2 Ag) .068 | | 54 | 6 | 35 | 1,200 | 50 | do | Do.[9] |
| 35 | Invar (36 Ni, bal. Fe) .060 | Brass (62.5 Cu, 37.5 Zn) .074 | | 54 | 6 | 40 | 1,200 | 50 | do | Do. |
| 36 | P metal (72 Mn, 18 Cu, 10 Ni) .054 | Invar (36 Ni, bal. Fe) .046 | | 60 | 5¼ | 40 | 1,200 | 50 | do | Do.[10] |
| 37 | F metal (72 Mn, 18 Cu, 10 Ni) .068 | Invar (36 Ni, bal. Fe) .058 | | 62 | 5¼ | 40 | 1,200 | 50 | do | Do.[10] |
| 38 | Alloy "B" (22 Ni, 3 Cr bal. Fe) .056 | "F"-metal (98 Cu, 2 Ag) .019 | Invar (36 Ni, bal. Fe) .075 | 60 | 5¼ | 40 | 1,200 | 50 | do | Do. |
| 39 | Nickel silver .230 | 18/8 Stainless steel .019 | | 66 | 5¼ | 40 | 1,700 | 20 | Salt bath | Do. |

NOTE.—Examples 1–39 were done at strip temperatures between room temperature and 250° F., i. e., without the need for atmospheric protection.

The following were done at elevated cold working temperatures with atmospheric protection until the point of bonding. The atmospheric protection was dissociated ammonia; it extended to within 1½" from the pinch point of the rolls. Jets of protective atmosphere were also directed at the strips near the rolls in order to give added protection to the strips during their travel of 1½" between the atmosphere chamber and the roll pinch.

| No. | Type of metals and gauge (inches) | | | Reduction, percent | Mill | | Sintering | | Sintering atmosphere | Surface preparation |
|---|---|---|---|---|---|---|---|---|---|---|
| | A | B | C | | Roll diameter (inches) | Exit speed (feet) per minute | Temp., °F. | Time (minutes) | | |
| 40 | SAE 1010 .080 | Monel .060 | | 55 | 5 | 25 | 1,400 | 10 | Diss. ammonia. | Wire brush.[11] |
| 41 | SAE 1010 .068 | Brass 70/30 .060 | | 58 | 5 | 25 | 1,200 | 10 | do | Do.[11] |
| 42 | Nickel .060 | Coin silver .045 | | 50 | 5 | 25 | 1,200 | 10 | do | Do.[12] |

[1] Quenched.
[2] Al was 4" wide, Cu and Ag were ¾" wide. Thus was produced an Al strip, having a ¾" wide Ag stripe in center with a copper interliner between Ag and Al.
[3] Al was 4", Cu was ¾" wide. Stripe similar to #21 but no silver.
[4] Steel 4" wide, 2 stripes of silver ¾" wide; distance between strips and distance stripe to edge was predetermined, and, of course, maintained by proper guiding.
[5] 4" wide, about 3,000 lbs. were made in 320 minutes.
[6] Solder on base opposite gold.
[7] More than 20 tons 4" wide have been made of this, average 400 lbs. per hour.
[8] 4" wide, about 400 lbs./hr.
[9] Sintered as coil, after that re-sintered 1400° F. 4 minutes in continuous furnace (strand anneal).
[10] The P metal was sanded and subsequently brushed.
[11] Bonding temperature 500° F.
[12] Bonding temperature 450° F.

Where possible, we prefer to work harden the softer metal before bonding in order to make its stiffness more nearly approach that of the metal to which it is to be joined. By this means we can minimize the differential elongation of these metals and thus even more perfectly maintain the desired thickness ratio. This is particularly important for soft metals like aluminum or silver, and especially if the soft metal is not appreciably thinner than the hard metal. Moreover, the higher hardness of such work-hardened metals makes it possible to obtain greater pressure and higher stresses in the deformation step for a particular amount of reduction, and, as a result, more nucleal bonds.

By increasing the mating areas as described, either by rolling or by one of the other above-mentioned means, several things are accomplished as follows:

(a) More virgin surfaces are exposed which under the deformation forces, are brought into contact with each other.
(b) Certain brittle films on the surface are pulled apart to expose virgin surfaces.

(c) Shear stresses are set up by the interaction of surface extension and forces pressing the surfaces together.

(d) The crystalline structure of the mating surfaces is distorted.

The consequences of these four results will be discussed hereafter.

Coming now to the third step in our process, that of heat-treating the metal layers so as to transform the nucleal bond into a continuous bond, this may be done at temperatures above or below the recrystallization temperature of either or both metals, the rate of growth of the nuclei being a function of time and temperature, being greater the higher the temperature and the longer the time. This heat treatment or sintering may be done by any method which uniformly heats the interface. In general, we prefer to sinter at temperatures above the recrystallization temperature of the metal having the lowest recrystallization temperature and below the temperature at which, for the particular combination of metals being sintered, brittle intermetallic compounds or liquid phases form. By sintering at such a temperature, not only is the time of completing the bond greatly reduced but, incidentally, the metals are brought to a softer condition. However, as indicated, the sintering may be done at lower than recrystallization temperature, where it is desired, for example, to keep the respective layers of metal in the work hardened condition induced by the deforming operation, in which case the time of the treatment has to be increased.

While we do not wish to be bound by any theories, we believe that the underlying phenomena of our invention can be explained as follows:

The classical theory of metallic bonding teaches that the solid structure of metals exists by virtue of the interatomic forces surrounding metal atoms. The resultant of these forces is only weakly attractive at separation distances greater than 10 to 20 atomic diameters, reaches a maximum attractive force at a considerably smaller distance, and then falls off to zero at a distance which may be termed the equilibrium position (that is, the lattice parameter of a solid metal). If metal atoms are pressed together closer than the equilibrium position, repulsive forces develop between them.

In attempting to develop a perfect bond between two metal surfaces, what we endeavor to do is bring the atoms on the surface of the one metal within the equilibrium distance of the atoms on the surface of the other metal.

Here it becomes clear why certain submicroscopic films amounting to only a few atomic diameters in thickness very greatly interfere with our bonding. By the increase in area specified in our process, any residual film, if brittle, pulls apart thus exposing new unsullied areas; while elastic films are thinned further and may be thus more easily pierced. When two surfaces are pressed against each other, they must of necessity come in contact on only certain discrete points, since no surfaces are perfectly smooth from an atomic point of view. These few points of contact at which the nucleal bonds form must withstand the full externally applied load and, consequently, are subjected to enormous pressure. Hence the compressive strength of the material is exceeded at these points, deformation takes place, and there is an increase in the size and number of these myriad contact areas. These are true metallic contact areas.

Figure 4:
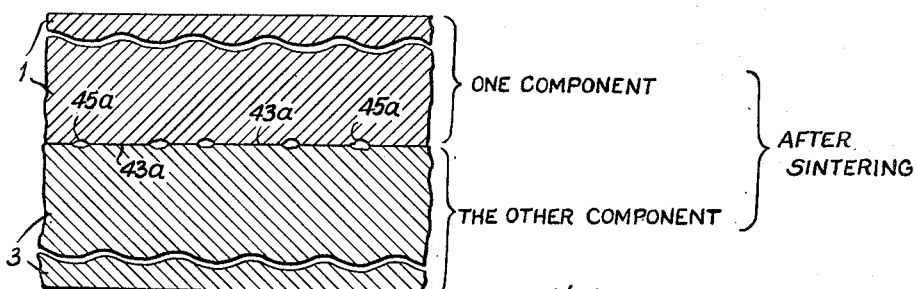
Figure 4 is a view similar to Figure 2 illustrating the finished product.

Surrounding the nucleal bonded areas is an extremely thin open space 45 (Figures 2 and 3). By virtue of the great surface deformation which the interface has undergone and by the very nature of the interface configuration, it is thermodynamically unstable and tends to attain a lower energy state. It is prevented from doing so by the fact that atoms of solid metal at relatively low temperatures are not very mobile. When we heat the metals to an elevated temperature, the atoms vibrate over wider distances, attain considerably more mobility, and become able to restore rapidly the thermodynamic equilibrium. As a result, there is a flow of metal atoms into the open space between the original nucleal bonds, which cause a growth of the bond area, at the expense of the open space 45, which growth, in the ideal case, stretches over the entire interface. Figure 4 illustrates this growth in bond area, the original nucleal bonds 43 being shown as having grown into a continuous area as indicated at 43a and the original open space 45 having been greatly broken up and reduced in area as indicated at 45a.

Referring now to Figure 1 of the drawings, which illustrates the first two steps of our bonding process where the deformation step is performed by rolling: Reference characters 1 and 3 designate metal strips which are to be solid-phase-bonded. The opposed surfaces of the two strips which become bonded are designated 5 and 7. As the strips travel to the rolling mill 9, they travel through a surface preparation apparatus 11 for removing the barrier films from surfaces 5 and 7 as described above. The strips then travel through a sweep chamber 13, wherein loose dust is removed from the surfaces 5 and 7, as, for example, by blowing the dust off the surfaces and exhausting the blown-off dust. From the sweep chamber, the strips travel to the rolling mill 9. Redeposition of dust on 5 and 7 must be prevented, for instance, by keeping the strips in contact with each other upon their emergence from the sweep chamber up to the rolling mill, as indicated at 15. The rolls of the rolling mill exert such pressure on the strips as to effect a substantial elongation of the mating surfaces, while the metals are under contact pressure. As is clear from Fig. 1, there occurs between the strips 1 and 3 a continuous transient passage of a narrow zone of squeezing pressure. In order that the increase in contact area shall be sufficient to carry out the invention, the percentage of reduction of the total thickness of the strips passing through the rolling mill must be more than 30%. Where the area increase is obtained by processes such as extrusion, upsetting, or drawing, and result in products whose configuration is such as to reduce the separating stresses (heretofore referred to as alligatoring stresses) the minimum nucleal bond strength can be less and, therefore, the area increase possibly smaller, consequently requiring less reduction. Particular examples of preferred reduction in a rolling mill, required for various combinations, are found in the above table.

Summarizing, our invention resides in carrying out in order the following steps, which have heretofore never been combined:

1. Preparing the surfaces of the metals for bonding by eliminating films which would otherwise act as a barrier to bonding (i. e., which would act as a barrier to bringing metal atoms into the range of interatomic attraction). Heretofore such a surface preparation has not been carried out. The scratch brushing and chemical cleaning heretofore used have been insufficient to eliminate barrier films and to maintain the surfaces in such prepared condition until bonding.

2. Deforming the metals (while maintaining their surfaces in the prepared condition) in such a way as to squeeze them together and considerably to increase their interfacial surface area with such deformation that nucleal bonds are formed. Heretofore such nucleal bonds were not consistently obtainable at cold working temperatures contemplated herein by reason of the existence of the noted barrier films.

3. Heating (sintering) the metals as held together by the nucleal bonds to cause a growth or spread of the area of the bonds to increase the overall strength of the bonding. This is to be distinguished from former heat treatments, the objectives of which were to soften the metals.

Thus as to the first step, it is to be emphasized that this involves what we regard as an entirely novel concept in respect to elimination of bond-inhibiting barrier film, i. e., any film which tends to prevent the formation of nucleal bonds under conditions of pressure and area increase. This step must of necessity be so thorough as to insure that no such film is present if a reliably operative method is to be obtained.

As to the second step, it is to be emphasized that this is designed to form true bonds wherein bonding force is due to interatomic attraction, rather than to form simply a mechanical interlocking of the components, such as relied upon by former workers in the field.

As to the third step, i. e., heating or sintering, prior art workers have not recognized that a nucleal bond can later and in a separate step be transformed into a complete bond.

Because of these differences from the prior art, and the realization of an entirely novel concept, our invention is eminently adaptable for the continuous bonding of two or more layers of metal, preferably when such layers are relatively thin. By "thin" is meant thicknesses of the order of magnitude of 0.5 inch or less. Such continuous bonding has many advantages, among which may be mentioned that long lengths of bonded material may be procured which are adaptable for the feeding of machines that produce metal parts automatically, thus lessening the need for the labor and expense involved in machine shutdowns and loading operations. By our process, in addition, there is less scrap which must be salvaged, because by the proper selection of reductions and the proper maintaining of the ratio of relative thicknesses, there is very little edge scrap that must be trimmed off, and little or no end loss.

In addition to the above advantages, the method makes it possible to bond certain combinations of metals which have hitherto been bondable only with the greatest of difficulty, if at all. An example of this is tantalum bonded to copper. In this case, we know of no commercially feasible prior art method of bonding these two metals. Tantalum oxidizes so readily that if prior art methods are used, no bond is obtained, unless the tantalum is heated and bonded in a vacuum. With our method, the bonding can be done in air.

If one desires by prior art methods to make long lengths of composite metals, it is necessary to bond relatively thick components and then repetitively roll and anneal as dictated by their work hardening characteristics. In many situations one of the layers work hardens much more rapidly than the other, thus requiring very frequent annealing operations. In other cases, the annealing temperature required may be higher for one metal than the other metal can stand without damage. With our method, the bonding can be done at a single pass through a rolling mill, or a single deformation operation, followed by a sintering step, and the materials may be so selected as to thickness that the single deformation or pass through the rolling mill results (after heat treating) in a completely bonded material without the necessity of further rolling operations. Nowhere in the prior art is there any teaching of a process which accomplishes these desirable results, with the simplicity and economy of our process.

In view of the above, it will be seen that the several objects of the invention are achieved and other advantageous results obtained.

As many changes could be made in the above method without departing from the scope of the invention, it is intended that all matter contained in the above description or shown in the accompanying drawings, shall be interpreted as illustrative and not in a limiting sense.

We claim:

1. The method of solid phase bonding malleable metals to form composite stock wherein any one component is bonded over its interfacial area to the contiguous interfacial area of an adjacent component, comprising the steps of preparing the surfaces of the components which are to be bonded by preliminarily removing gross contaminants and heating said surfaces to eliminate films which would otherwise act as a barrier to bonding, then squeezing said components together to effect a reduction in their combined thicknesses of at least 30% with concomitant increase in the interfacial area, insuring that the prepared surfaces are protected from reformation of any barrier films from the time of treatment up to the time of squeezing, the temperature of the metals at the time they enter the squeezing step being below the recrystallization temperature of the metal having the lowest recrystallization temperature, the reduction being such as to effect the formation of a multitude of discrete bonds with the integrated strength of said discrete bonds being barely sufficient to hold the metals together during subsequent handling operations and heating the components held together by said bonds at a temperature lying within the range which extends from approximately the recrystallization temperature of the metal having the lowest recrystallization temperature to a point below one of those temperatures, whichever is the lower, at which liquid phase material would form, or at which a brittle intermetallic compound would form in appreciable amount, said heating being continued for such a length of time as to effect growth of the bonds thereby to increase the overall bond strength.

2. The method defined in claim 1 wherein the first said heating step comprises scratch brushing with an energy input sufficient to cause a temperature rise which will eliminate residual hydrated and/or organic films.

3. The method defined in claim 1 wherein the removal of gross contaminants is by pickling.

4. The method defined in claim 1 wherein the heating to eliminate the films is done under bright annealing conditions.

5. The method of solid phase bonding of malleable metals comprising the steps of preparing the surfaces of the metals which are to be bonded by removing gross contaminants and heating said surfaces substantially to eliminate any bond-deterrent film, bringing the metals while at a temperature below the recrystallization temperature of the metal having the lowest recrystallization temperature to a squeezing means and squeezing the metals with the prepared surfaces in contact and free for lateral expansion under such pressure as to effect a minimum of 50% reduction in their combined thickness, thus effecting a substantial increase in interfacial area of the metals, said increase being of such magnitude as to effect a solid phase incomplete bonding of the metals characterized by a multiplicity of discrete metallic bonds spread throughout the interfacial area with the over-all bond strength of the discrete bonds a minor fraction of the strength of the complete continuous solid phase bond between the metals, and finally heating the composite metal at a temperature above the recrystallization temperature of the component having the lowest recrystallization temperature, but below the temperature at which liquid phase material or a brittle intermetallic compound will form in appreciable amount, so as to develop the initial incomplete bond into a substantially complete continuous bond.

6. The method according to claim 5, wherein the squeezing step includes a continuous transient passage of a narrow zone of squeezing pressure.

7. The method of bonding malleable metals which have gross contaminants removed from those of their surfaces which are to be interfacially bonded, at least one of said surfaces having a bond-deterrent hydrated oxide film thereon, comprising heating said surfaces to convert said hydrated oxide film into an innocuous brittle oxide film and to eliminate any other type of bond-deterrent film as may be thereon, squeezing the mating surfaces together to effect a reduction in their combined thickness of at least 30% while concurrently deforming the metals so as to produce an increase in area of the mating surfaces, whereby concurrently to crack and pull apart any brittle oxide film to permit discrete bonds to form between newly formed interfacial surfaces, with the integrated strength of said discrete bonds being barely sufficient to hold the materials together during subsequent handling, and thereafter subjecting the composite material to a heat treatment at a temperature lying within the range which extends from approximately the recrystallization temperature of the metal having the lowest recrystallization temperature to one of those temperatures, whichever is the lower, at which liquid phase material would form, or at which a brittle intermetallic compound would form in appreciable amount, said heating being continued for such a length of time as to cause said discrete bonds to enlarge to form a substantially continuous bond over the entire interface.

8. The method defined in claim 1, wherein one of two adjacent metals is softer than the other, including the step of work-hardening the softer of the two metals so as to increase its hardness to a point more nearly approaching the hardness of the other.

9. The method of solid phase bonding malleable metals which have gross contaminants removed from those of their surfaces which are to be interfacially bonded, comprising heating said surfaces to eliminate films which would otherwise act as a barrier to bonding, then squeezing said components together to effect a reduction in their combined thicknesses of at least 30% with concomitant increase in the interfacial area, insuring that the prepared surfaces are protected from reformation of any barrier films from the time of treatment up to the time of squeezing, the temperature of the metals at the time they enter the squeezing step being below the recrystallization temperature of the metal having the lowest recrystallization temperature, the reduction being such as to effect the formation of a multitude of discrete bonds with the integrated strength of said discrete bonds being barely sufficient to hold the metals together during subsequent handling operations, and heating the components held together by said bonds at a temperature lying within the range which extends from approximately the recrystallization temperature of the metal having the lowest recrystallization temperature to a point below one of those temperatures, whichever is the lower, at which liquid phase material would form, or at which a brittle intermetallic compound would form in appreciable amount, said heating being continued for such a length of time as to effect growth of the bonds thereby to increase the overall bond strength.

References Cited in the file of this patent

UNITED STATES PATENTS

| Number | Name | Date |
| --- | --- | --- |
| 1,043,576 | Eldred | Nov. 15, 1912 |
| 1,130,077 | Eldred | Mar. 2, 1915 |
| 1,667,787 | Jaeger | May 1, 1928 |
| 2,414,511 | Dyar | Jan. 21, 1947 |
| 2,484,118 | Reynolds | Oct. 11, 1949 |
| 2,522,408 | Sowter | Sept. 12, 1950 |

OTHER REFERENCES

"Solid Phase Welding," Adams Lecture, by A. B. Kinzel, pub. December 1944 in "Welding Journal" by American Welding Society, pp. 1124–1145. Copy in Scientific Lib.

Tylecote, R. F.: "Pressure Welding of Light Alloys Without Fusion," pub. Transactions of the Institute of Welding, November 1945, pp. 163–178.

"Observations on Solid Phase Bonding," by George Durst, January 1947, pp. 97–101, Metal Progress.

Cady, E. L.: "When Metal Atoms Wander," pub. Scientific American, July 1947, pp. 15–17.

Publication Welding Engineer, January 1949, pp. 33, 34, 35.

Sowter, A. B.: "Materials Joined by New Cold Welding Process," pub. Welding Journal, February 1949, pp. 149–152.

Kelley, F. C.: "Pressure Welding," pub. Welding Journal, August 1951, pp. 728–736.